(12) United States Patent
Campbell

(10) Patent No.: US 7,136,643 B2
(45) Date of Patent: Nov. 14, 2006

(54) REAL-TIME PROGRAMMING OF ELECTRONIC RADIO SYSTEM RESOURCE ASSETS

(75) Inventor: Michael E. Campbell, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 123 days.

(21) Appl. No.: 10/446,344

(22) Filed: May 28, 2003

(65) Prior Publication Data

US 2003/0194996 A1 Oct. 16, 2003

Related U.S. Application Data

(63) Continuation of application No. 09/651,752, filed on Aug. 30, 2000, now abandoned.

(51) Int. Cl.
  *H04Q 7/20* (2006.01)
  *H04B 1/38* (2006.01)
(52) U.S. Cl. ................... 455/431; 455/418; 455/553.1; 455/90.1; 455/90.2; 375/259; 375/316; 375/295; 342/37; 340/10.1
(58) Field of Classification Search ................. 455/131, 455/161.1, 165.1, 431, 98, 550.1, 418, 83, 455/313, 82, 426.1, 86, 432.1, 84, 442, 558, 455/553.1, 552.1, 90.2, 90.1, 73; 342/37; 340/10.1; 375/259, 316, 340, 295, 219
See application file for complete search history.

(56) References Cited

U.S. PATENT DOCUMENTS

| 5,212,804 | A | 5/1993 | Choate ....................... 455/431 |
| 5,798,726 | A | 8/1998 | Schuchman et al. .......... 342/37 |
| 5,898,683 | A | 4/1999 | Matsumoto et al. ........ 455/423 |
| 5,953,668 | A | 9/1999 | Reilly ......................... 370/331 |
| 6,052,604 | A | 4/2000 | Bishop, Jr. et al. ......... 455/431 |
| 6,072,994 | A * | 6/2000 | Phillips et al. ................ 455/84 |
| 6,353,846 | B1 | 3/2002 | Fleeson ...................... 718/104 |
| 6,944,475 | B1 * | 9/2005 | Campbell .................. 455/90.2 |
| 2003/0194996 | A1 * | 10/2003 | Campbell ................... 455/431 |
| 2004/0087283 | A1 * | 5/2004 | Jones et al. ................. 455/132 |

OTHER PUBLICATIONS

Harris, "Modular Avionics: Its Impacts on Communication, Navigation, and Identification (CNI)", Proceedings of the IEEE National Aerospace and Electronic Conference, NAECON '88, vol. 3, pp. 1164-1169, May 23-27, 1988.*

(Continued)

*Primary Examiner*—George Eng
*Assistant Examiner*—Sharad Rampuria

(57) ABSTRACT

A method to efficiently implement a reconfigurable electronic radio system (400) including resource assets (402–408, 410–416, 418, 420–426, 428) and a processor (428). The processor (428) generates RF control and switching control signals during each mission segment of an aircraft to create radio function threads through the resource assets (402–408, 410–416, 418, 420–426, 428) to realize the radio functions for that mission segment. The processor (428) may also be coupled to a master processor (440) that sends the processor (428) a radio function set selection signal. The radio function set selection signal identifies the radio function set that the processor (428) will implement through the resource assets (402–408, 410–416, 418, 420–426, 428). The processor (428) performs all signal, data, message, cryptographic and control processing required for the radio function threads being implemented by the resource assets.

17 Claims, 8 Drawing Sheets

OTHER PUBLICATIONS

Bryson, "Integrated CNI Terminal Software Architecture", Proceedings of the IEEE National Aerospace and Electronic Conference, NAECON '89, vol. 4, pp. 1713-1721, May 22-26, 1989.*

Wolfe et al., "Integrated CNI Avionics Using F-22 Modular Products", Proceedings of the IEEE National Aerospace and Electronic Conference, NAECON '96, vol. 1, pp. 264-271, May 20-23, 1996.*

Brousseau et al., "An Open System Architecture For Integrated RF Systems", Digital Avianoics Systems Conference, 1997, 16th DASC, AIAA/IEEE, Oct. 30, 1997, vol. 1, pp4.1-1-5, no month listed.

Rich, "Affordable Integrated Sensor System", Digital Avionics Systems Conference, 1996, 15th AIAA/IEEE, Oct. 31, 1996, pp267-272, no month listed.

European Search Report dated Jul. 13, 2006 issued from European Patent Office for European counterpart patent application No. EP 06012676.0-2411.

Richard A. Bryson, "Integrated CNI Terminal Software Architecture", *Proceedings of the 1989 IEEE National Aerospace and Electronics,* TRW Military Electronics and Avionics Division, vol. 4, May 22, 1989, pp. 1713-1721.

* cited by examiner

REAL-TIME PROGRAMMING OF ELECTRONIC RADIO SYSTEM RESOURCE ASSETS

CROSS-REFERENCE TO RELATED APPLICATIONS

This is a continuation of Ser. No. 09/651,752 filed Aug. 30, 2000 now abandoned.

This application is related to Ser. No. 09/651,754 filed Aug. 30, 2000 now U.S. Pat. No. 6,944,475 B1 and Ser. No. 10/606,107 filed Jun. 25, 2003, which is a continuation of Ser. No. 09/651,757 filed Aug. 30, 2000 now abandoned.

BACKGROUND OF THE INVENTION

The present invention relates to avionics and electronic radio systems. In particular, the present invention relates to a real time reprogrammable electronic radio system.

Military aircraft require an electronic radio or CNI avionics system capable of implementing three important classes of functions: communications, navigation and identification (CNI). Communications functions include, for example, communicating over a voice radio and interfacing into a data network; navigation functions include, for example, receiving input radio beacons, glide slope indicators and the global positioning system (GPS); identification functions include, for example, friend-or-foe interrogation. In the case of civilian aircraft, where military identification functions are not required, surveillance functions are typically substituted. Surveillance functions include, for example, civil identification, and position and flight path determination of other aircraft. Communication functions, navigation functions, identification functions, and surveillance functions are generally referred below as the radio functions of an electronic radio system.

In the past, a predetermined set of independent resource assets implemented a typical radio function. Resource assets include, for example, antennas, antenna preconditioning units, receive preselectors, transceivers (or transmitters and receivers), modems (or modulators and demodulators), digital signal processors, amplifiers, microphones, headsets, and the like. Thus, a voice channel reception radio function might be implemented using an antenna, an antenna preconditioning unit, a preselector, a transmit power amplifier, a receiver, a modem, a digital to analog converter, and a headset. The resource assets were dedicated to the particular radio function that the resource assets were designed to perform.

In other words, prior electronic radio systems were developed using point design architectures that were unique to the radio functionality being provided. Each radio function required a separate dedicated architecture that lead to a fixed design that was difficult to modify, for example, for performance upgrades and technology enhancements. As the total number of radio functions increased that the aircraft was required to perform, so did the complexity and the size, weight, and power requirements of the electronic radio system as a whole. However, the need to limit the size, weight, and power requirements in an aircraft is paramount.

Aircraft, and in particular military aircraft, commonly have their flight plans broken up into units referred to as mission segments. Commonly, during any given mission segment, the aircraft exercises only a predetermined subset of the radio functions that the aircraft supports. As examples, missions segments may include "Departure and Recovery", during which a first subset of radio functions operate, "Air-to-Air Combat and Ground Attack", during which a second subset or radio functions operate, and "Safe Return to Base", during which a third subset or radio functions operate. Although the aircraft uses only a subset of all its radio functions during a particular mission segment, past electronic radio system designs often required the aircraft to carry all of the resource assets necessary to provide the full set of radio functions at all times.

The path that radio function data takes through the resources assets that support that radio function is referred to as a function thread. For example, a VHF voice reception radio function thread may start at a VHF antenna, continue through a VHF antenna interface unit, a VHF receiver, a signal processor, a special VHF voice interface to the intercom, and finally a headset. One disadvantageous aspect of prior design techniques was that radio function threads were formed using independent sets of resource assets. In other words, resource assets were not shared based upon the radio function requirements for the current mission segment, thereby leading to the over-inclusion of resource assets to realize the electronic radio system.

In an effort to limit the size, weight, and cost of a electronic radio system, a building block approach was developed. Each building block was capable of performing a portion of the processing required by several different radio functions. However, many different types of building blocks (called common modules) existed. Thus, while an electronic radio system built using the wide variety of building blocks was able to share common installation, packaging and infrastructure resources, the resulting integrated control and data routing created complex interdependencies between radio functions. The interdependencies further complicated the development cycle, and increased the potential for unexpected impact on one set of radio functions as a result of repair, replacement, or upgrade of another radio function.

A need has long existed in the industry for a reprogrammable electronic radio system that addresses the problems noted above and others previously experienced.

BRIEF SUMMARY OF THE INVENTION

One aspect of the present invention is an electronic radio system that provides a reduced reconfigurable set of resource assets to implement multiple CNI functions. The reconfigurable set of resource assets process increased flexibility and capability over the earlier common modules, while reducing the architectural complexity and SWAP requirements of the electronic radio system, and still provide the aircraft with all the CNI functions simultaneously required at any given time.

Another aspect of the present invention is an electronic radio system that simultaneously provides the CNI functions necessary within a given aircraft mission segment.

Yet another aspect of the present invention is an electronic radio system that provides for redundancy of critical CNI functions.

Yet another aspect of the present invention is a design methodology for an electronic radio system that provides a design including a minimal set of resource assets to implement multiple sets of CNI functions. The use of a minimal set of resource asserts leads to decreased SWAP requirements.

A preferred embodiment of the present invention provides an electronic radio system including RF resource assets and a processor. The processor generates RF control and switching control signals during each mission segment of the aircraft to create CNI function threads through the RF resource assets to realize the CNI functions needed during that mission segment. The processor may also be coupled to an identical processor designated as the master that sends the processor a CNI function set selection signal. (For a small single processor application, the master is within that processor.) The CNI function set selection signal controls the CNI function set that the processor will implement through the resource assets. The master processor may generate the CNI function set selection signal based on the current mission segment of the aircraft. Alternatively, the master processor may generate the CNI function set selection signal based on pilot overrides.

The invention also provides a method for the controlling asset resources in an electronic radio system. The method first determines the CNI functions that are to be implemented during a first, second, etc., mission segment. There may be as many as 6 to 8 mission segments in any given mission. Also, for a multi-role aircraft, there may be several mission types that it must perform, each with a slightly different mission segment set. Then resource assets are configured to create CNI function threads to realize the first mission segment CNI functions when the aircraft is in the first mission segment. When the aircraft then enters the second mission segment, the resource assets are reconfigured to create CNI function threads to realize the second mission segment CNI functions, and so on.

The invention further provides a method for designing electronic radio systems. The method begins with determining the mission types that the aircraft must perform. Then the method determines the segments for each mission. Then, CNI functions for each of the segments are determined. After this, resource assets are allocated that can create the necessary CNI function threads to realize the CNI functions defined within each mission segment, and for each mission type. After the allocation of resource assets, the interconnection of the resource assets through switching hardware is determined. Finally, the set of resource assets is minimized using a least common assets approach, such that it encompasses only those resource assets necessary to create CNI function threads within each and every mission segment independently of CNI functions required during other mission segments. This is the final compliance test.

DETAILED DESCRIPTION OF THE INVENTION

Figure 1:
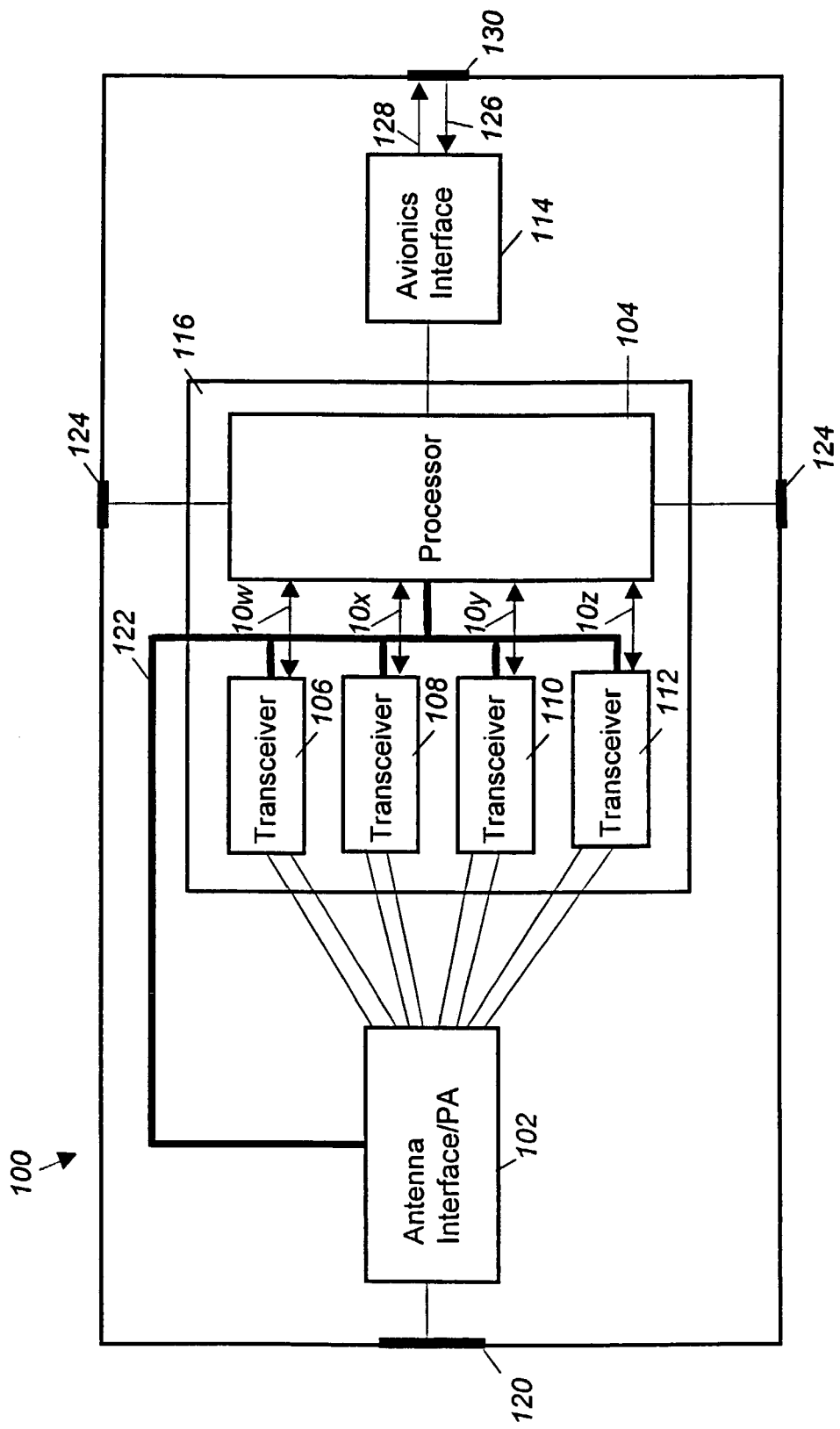
FIG. 1 illustrates an electronic radio system multifunction slice.

Turning now to FIG. 1, that figure illustrates an electronic radio system multifunction slice 100 for an electronic radio system. The multifunction slice 100 includes an antenna receive/transmit (R/T) interface which includes a PA 102, a digital processor 104, multi-band transceivers 106, 108, 110 and 112, and an avionics interface 114. The processor 104 and the transceivers 106, 108, 110 and 112 are shown grouped together as a transceiver-processor building block 116. The transceiver-processor building block 116 is discussed in detail below with reference to FIGS. 7 and 8. Each multifunction slice is a programmable multifunction radio identical in construction to every other multifunction slice, and, as will be described below, may be coupled together to create more complex electronic radio systems. Note that while the multifunction slice 100 is shown as having four transceivers 106, 108, 110 and 112, a multifunction slice may have greater or fewer transceivers, according to the particular application, and optimization of resource assets as described below.

The transceivers 106, 108, 110 and 112 provide transmit exciter and receive functionality in the frequency spectrum assigned to the radio functions for which the multifunction slice 100 is responsible. The transceivers 106, 108, 110, and 112 are preferably tunable over a very wide range of frequencies (e.g., from VHF band to L band) in order to support a wide range of radio function frequencies. As a result, fewer transceivers are generally needed in each multifunction slice, thereby facilitating the size, weight, and cost benefits of the slice based architecture described in more detail below.

The antenna R/T interface with transmit PA 102 of the slice couples one or more antenna preconditioners to the transceivers 106, 108, 110 and 112. The antenna R/T interface 102 is accessible external to the slice through the antenna connector 120, and provides antenna selection switching, preselector filtering and transmit RF power amplification. The processor 104 controls the mapping of particular antenna preconditioners to particular transceivers via the antenna R/T interface 102 and perform all required signal processing (modem), data processing and cryptographic processing. Control is provided in the form of RF control signals sent from the processor 104 to the antenna R/T interface 102 over the local RF control bus 122.

The processor 104 is accessible external to the multifunction slice 100 at one or more CNI network bus connectors 124. The multifunction slice 100 may be interconnected to one or more other multifunction slices through the CNI network bus connectors 124. The local RF control bus 122 also connects the processor 104 to each of the transceivers 106, 108, 110 and 112 to provide commands for tuning and setting other parameters, and to the antenna R/T interface to select frequency settings and control switch positions. The processor 104 is connected to transceivers 106, 108, 110, 112 via bi-directional data interfaces (analog or digital) 10w, 10x, 10y, 10z. The processor 104 and its interconnection with other components of the electronic radio system multifunction slice 100 is discussed in detail with respect to FIGS. 7 and 8 below.

The avionics interface 114 couples the core avionics of the aircraft to the processor 104. The avionics interface provides an avionics input 126 and an avionics output 128. The avionics input 126 and output 128 are accessible at the avionics connector 130 of the electronic radio system multifunction slice 100. The avionics input 126 may be used, for example, to accept unencrypted voice signals that are to be encrypted and then transmitted. The avionics output 128 may provide, for example, data signals that have been received and decrypted, and are to be used elsewhere in the aircraft.

Figure 2:
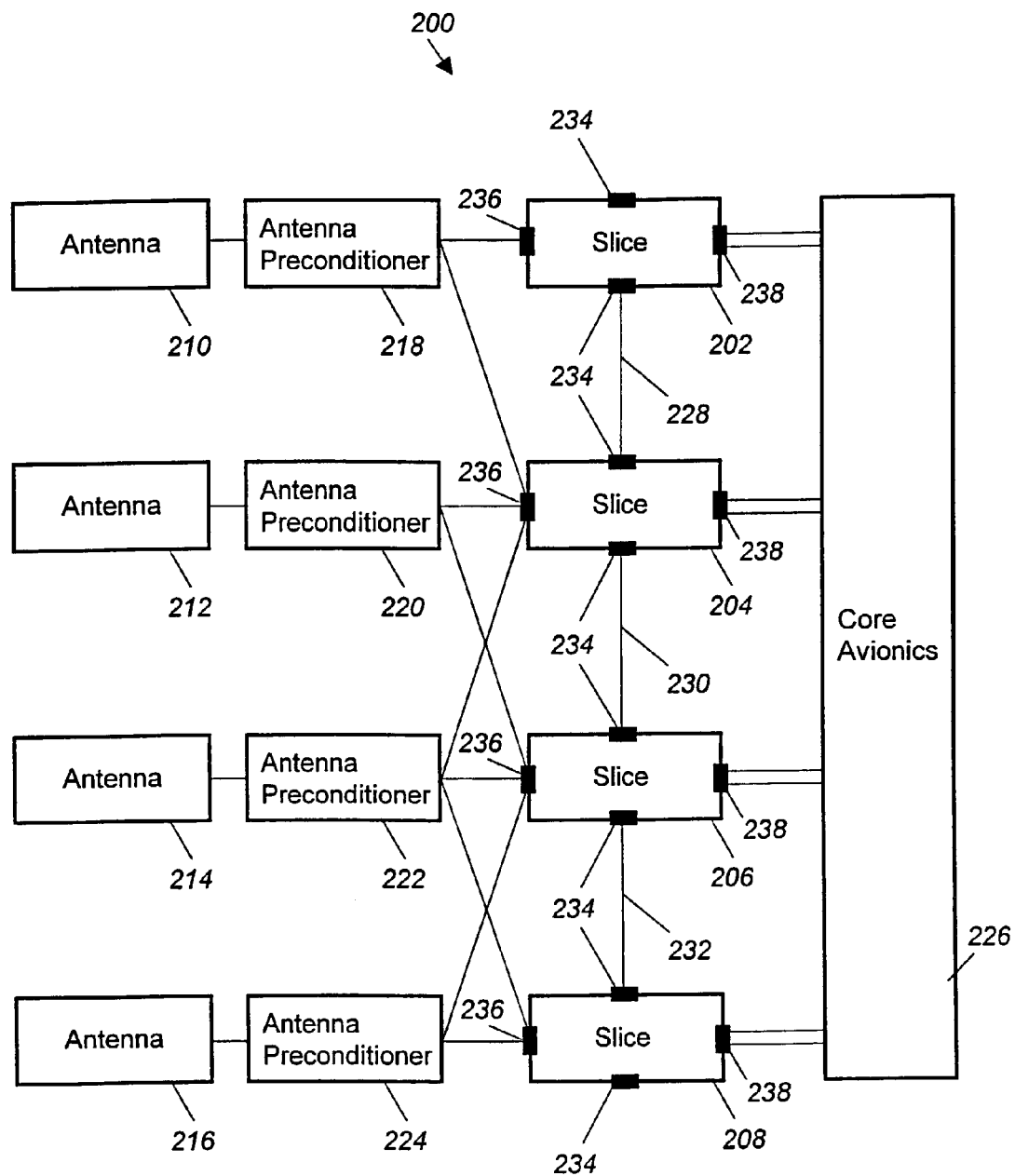
FIG. 2 illustrates a multifunction electronic radio system implemented using multifunction slices.

With reference now to FIG. 2, that figure illustrates a multifunction electronic radio system 200 composed of four multifunction slices 202, 204, 206 and 208. Also shown in FIG. 2 are antenna apertures 210, 212, 214, and 216, antenna preconditioners 218, 220, 222, and 224, and core avionics 226.

The multifunction slices 202, 204, 206, and 208 are interconnected in accordance with the requirements of the particular bus architecture used to implement the CNI network bus interface of each multifunction slice 202, 204, 206, and 208. For example, the multifunction slices 202, 204, 206 and 208, may be coupled together using IEEE-1394 serial connections 228, 230, and 232 between the CNI network bus connectors 234.

The multifunction slices 202, 204, 206, and 208 are coupled to the antenna preconditioners of the aircraft at the antenna connectors 236 of the electronic radio system multifunction slices 202, 204, 206 and 208. It is not necessary that each multifunction slice 202, 204, 206, and 208 be connected to each of the antenna preconditioners. However, connecting a particular multifunction slice to a particular antenna preconditioner allows that multifunction slice to run function threads through the preconditioner and associated antenna.

The multifunction slices 202, 204, 206, and 208 are also coupled to the core avionics 226 of the aircraft at the avionics connectors 238 of the electronic radio system multifunction slices 202, 204, 206, and 208. The core avionics 226 of the aircraft provides input to the multifunction slice from the rest of the aircraft. The core avionics 226 also receives the output of the electronic radio system multifunction slices 202, 204, 206, and 208. The core avionics 226 thereby servers as a general input/output structure that delivers information to be transmitted to the electronic radio system 200 and that delivers information received by the electronic radio system 200 to, as examples, headsets, cockpit displays, or aircraft computers.

Figure 3:
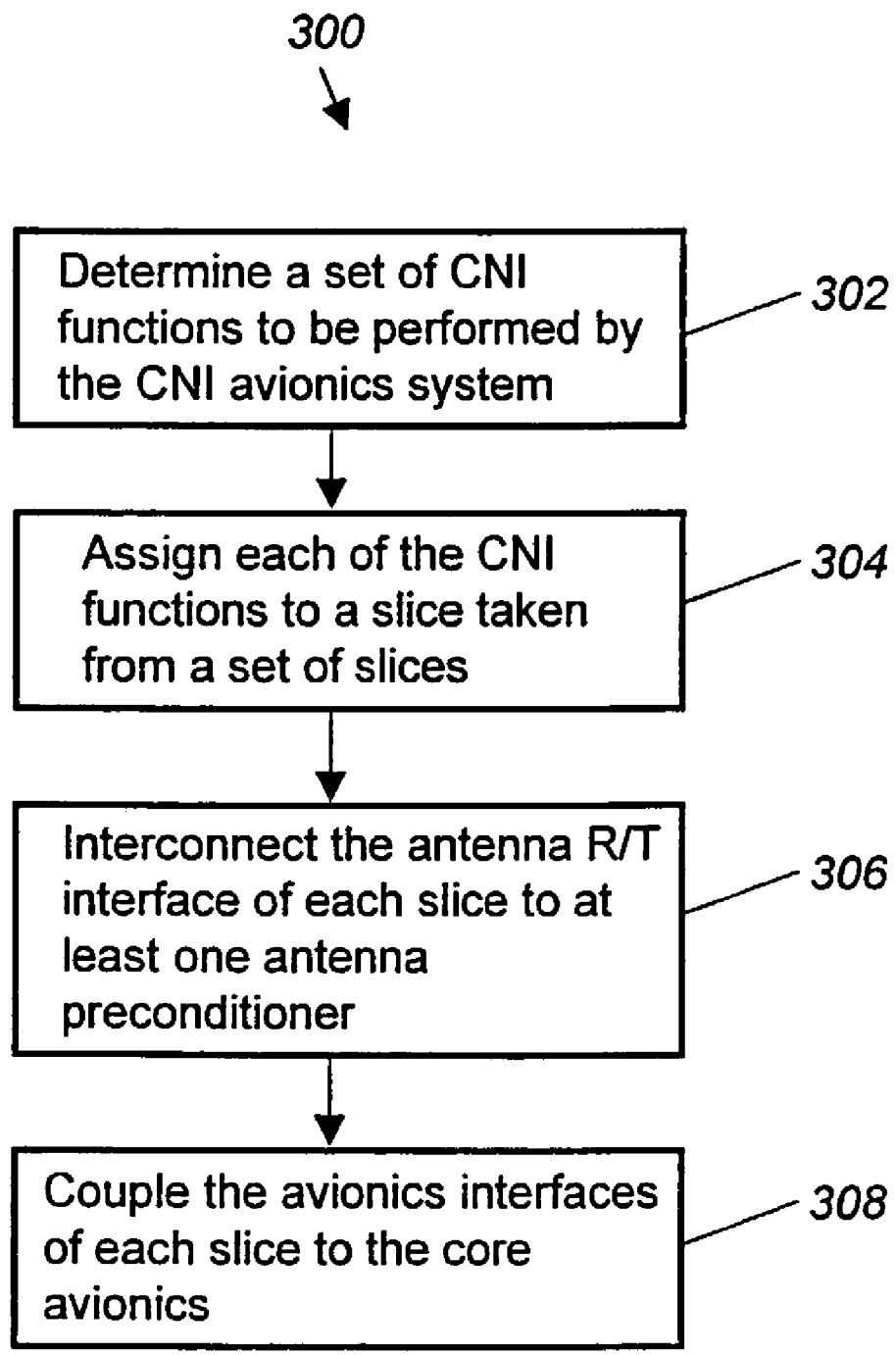
FIG. 3 shows a method for implementing a multifunction electronic radio system using multifunction slices.

Turning next to FIG. 3, that figure shows a flowchart 300 of a method of implementing a multifunction electronic radio system. At step 302, the set of radio functions (i.e., types of radio functions) to be implemented by the electronic radio system is determined. The total number of simultaneous radio functions required and the number of radio functions that each multifunction slice can implement will determine a minimum number of slices needed. The transceivers used in each identical multifunction slice are of course selected to support the frequency bands used by the radio function threads. By implementing a transceiver operable over as wide frequency range as possible, fewer transceiver types and consequently fewer overall transceivers are generally needed in each multifunction slice.

At step 304, each of the radio functions identified in step 302 is assigned to a particular multifunction slice. At step 306, each multifunction slice is connected to each of the antenna preconditioning units associated with a radio function supported by that multifunction slice. If, for example, multiple radio functions supported by a multifunction slice share a common preconditioner, then a only single connection is preferably made to that preconditioner. At step 308, each multifunction slice is connected to the core avionics of the aircraft.

Once the multifunction slices are selected and interconnected, the processor in the multifunction slices is primarily responsible for transmission and reception of voice, data or radio navigation over each function thread. As will be discussed in more detail below, one processor will be designated the master processor to exercise coordination over all multifunction slice to program and reprogram the assignment of function threads to resource assets.

Figure 4:
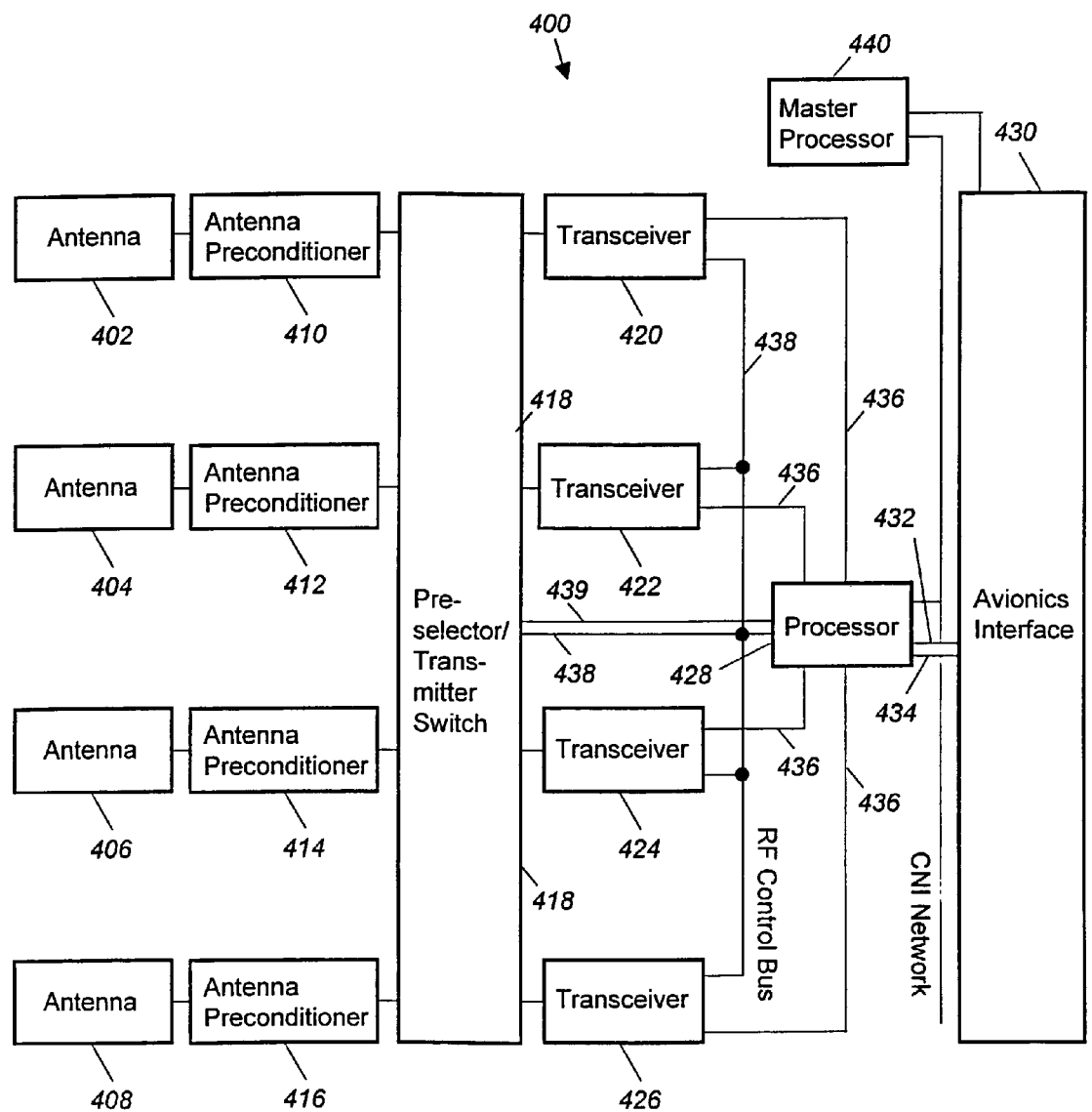
FIG. 4 illustrates an electronic radio system with reprogrammable resource assets.

Turning next to FIG. 4, that figure illustrates an electronic radio system 400 that is capable of reprogramming resource assets in real time. The electronic radio system 400 comprises antennas 402, 404, 406 and 408, antenna preconditioners 410, 412, 414, and 416, preselector/transmitter switch 418, transceivers 420, 422, 424 and 426, processor 428, and avionics interface 430.

The antennas 402, 404, 406 and 408 support reception and transmission of signals at the frequencies assigned to the radio functions performed by the electronic radio system 400. While the electronic radio system 400 is shown in FIG. 4 as having four antennas, an electronic radio system may have more or fewer antennas depending on the particular function thread requirements of the electronic radio system 400. Each of the antennas 402, 404, 406, and 408 is coupled, respectively, to an antenna preconditioner 410, 412, 414 and 416.

The antenna preconditioners 410, 412, 414 and 416 are coupled to the preselector/transmitter switch 418. The preselector/transmitter switch 418 may be, for example, a 4-by-4 switch or a N×M switch, plus a RF power amplifier. The preselector/transmitter switch 418 may map on a one-to-one basis, or it may be capable of operating in a multicast mode. Each of the transceivers 420, 422, 424 and 426, is also connected to the switch 418. Voice and data from each of the transceivers 420, 422, 424 and 426, is communicated to the avionics interface 430 through the processor 428 via the input connection 432 and the output connection 434 (which may be associated with a CNI network bus connection described in FIG. 7). Note that the preselector/transmitter switch 418 need not be a full N×N switch, and that additional switches may be provided between any of the resource assets. The processor 428 controls the preselector/transmitter switch connectivity provided in order to support programmable function threads as described below.

The processor 428 is connected to each of the transceivers 420, 424, 426 and 428 by local I/Q interfaces 436. The processor 428 controls the transceivers 420, 424, 426 and 428, and the preselector/transmitter 418, by sending RF control signals over the RF control bus 438, for example, to command the transceiver to tune to a particular frequency and receive data, and to statically setup the preselector/transmitter switch 418. The processor 428 is also connected to the preselector/transmitter switch 418 (and any other switches provided) by means of switch control line 439. The processor 428 may then send appropriate low latency switching control signals over the switch control line 439 to control the input/output behavior of the preselector switch 418 in real-time.

During a particular mission segment, the processor 428 will generate RF control signals and switching control signals to create radio function threads that realize the radio functions required during that mission segment. For example, during a departure and recovery mission segment, the processor 428 generates RF control signals and switching control signals to create radio function threads to realize departure and recovery radio functions. Departure and recovery CNI functions may include, for example, voice communications, glide-slope indication and radio beacon acquisition.

In this respect, the processor 428 acts as a switching control unit to provide signal interconnection between resource assets to implement complete function threads. Thus, for example, in a voice transmission radio function, the processor 428 implements a path from the avionics interface, through the processor (where modem encoding and encryption may occur), through a transceiver (where exciter modulation, filtering, and amplification occur), through the preselector/transmitter switch 418 (where antenna connectivity and RF power amplification will occur), to a preconditioner, and finally to an antenna for radiation into space.

When the aircraft changes mission segments, for example, to an air-to-air combat and ground attack mission segment, the processor 428 generates the RF control signals and switching control signals that create radio function threads that realize air-to-air combat and ground attack radio functions. Air-to-air combat and ground attack radio functions may include, for example, encrypted voice communications, reception on channels over which special orders are transmitted, C-cell, narrow-band (NB) data reception (from a satellite, for example), Integrated Broadcast Services (IBS), IFF Interrogation, IFF Transponder, Radar Altimeter, Link-16 (JTIDS) Secure and ECCM Voice and Data Communications, and Global Positioning System threads (GPS).

The processor 428 preferably generates RF control signals and switching control signals to implement only the radio function threads required in each mission segment. As a result, the electronic radio system need include only the resource assets required to support the maximum simultaneous number of radio function threads across the mission segments. For example, assume that Table 1 represents the resource assets required in each of three mission segments A, B and C. Table 2 then shows the resource assets needed to implement the electronic radio system under prior independent resource asset design paradigms and the present reprogramable resource asset paradigm.

TABLE 1

| Mission Segment | Resource Assets Required |
|---|---|
| A | Q, R, S |
| B | R, S, T |
| C | R, R, S |

TABLE 2

| Design Used | Assets Required |
|---|---|
| Independent | Q, R, R, R, R, S, S, S, T |
| Reprogrammable | Q, R, R, S, T |

As Table 2 shows, a substantial savings in the total number of resource assets required results through reassigning the function threads to the Q, R, R, S, and T resource assets as governed by the current mission segment. In an electronic radio system designed using independent resource assets for each function thread, a total of nine resource assets are required. However, in the present real-time reprogramable electronic radio system, only five asset resources are required. A substantial decrease in the total number of resource assets leads to a direct decrease in the size, weight, and power (and cost) requirements of the electronic radio system.

In operation, the processor 428 receives a radio function set selection signal over the CNI network bus, for example. The radio function set selection signal indicates the to the processor 428 which radio function threads are presently required. The processor 428 may receive the radio function set selection signal from the designated master processor 440 that tracks the current mission segment of the aircraft. Alternatively, the radio function set selection signal may be received over the avionics interface in response to a pilot override or selection switch.

Re-programmability of resource assets also leads to increased fault tolerance for critical radio functions. A resource asset that fails may be circumvented by the processor 428 through RF and switching control signals that implement an alternate radio function thread that avoids the failed resource asset. Depending on the total number of radio functions that may be implemented and the number of radio functions used in the current mission segment, re-threading a critical radio function may cause a non-critical (or lower priority critical) radio function to become unavailable. Priorities among the various radio functions of each mission segment may be pre-programmed in the master processor 440 before a mission, with radio functions re-threaded according to their priorities. Alternatively, the pilot may also assign or override priorities for the radio functions in real time using a radio function demand switch assigned to any desired radio function.

Figure 5:
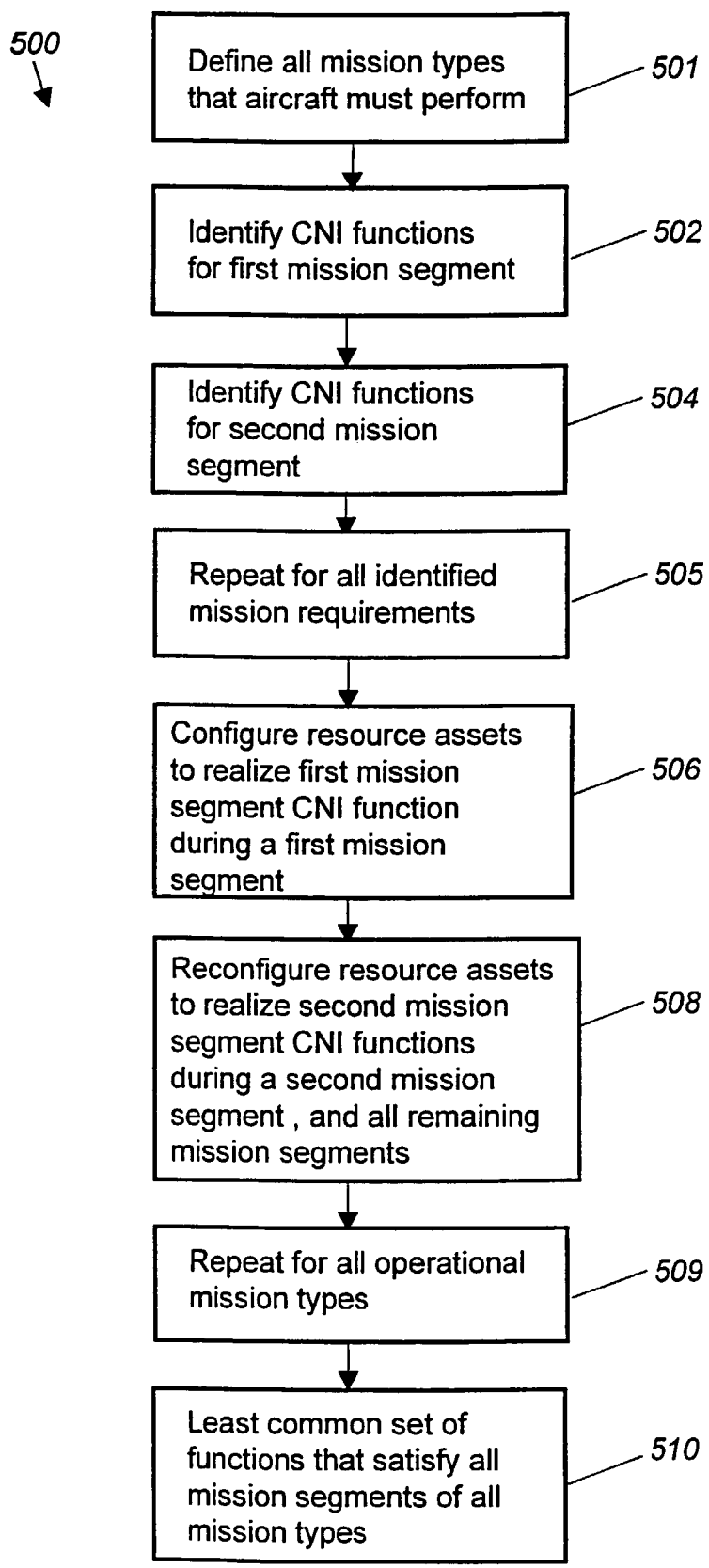
FIG. 5 shows a method for controlling a set of resource assets in an electronic radio system.

Turning now to FIG. 5, that figure shows a flowchart 500 of the inventive method for controlling a set of resource assets in an electronic radio system. First, at step 501, define all the mission types that a weapon system platform must perform (e.g., CAS, AI, AA, SEAD), and the segments for each mission type. At step 502, the radio functions required during a first mission segment for the first mission type for the aircraft are determined. Similarly, the radio functions required during a second mission segment for the aircraft are determined (step 504). Step 505 repeats the above for all mission segments of the first mission type.

At step 506, a set of resource assets are configured to realize the first mission segment radio functions when the aircraft is operating in the first mission segment. As noted above, the configuration may include generating RF control signals and switching control signals to create radio function threads. Subsequently, when the aircraft is operating in a second mission segment, the resource assets are reconfigured to realize the second mission segment radio functions, and all remaining mission segments (step 508). Step 509 repeats steps 502, 504, 506 and 508 for all the remaining mission types. Step 510 then finds the least common set of functions required that will satisfy all mission phases for all mission types.

Figure 6:
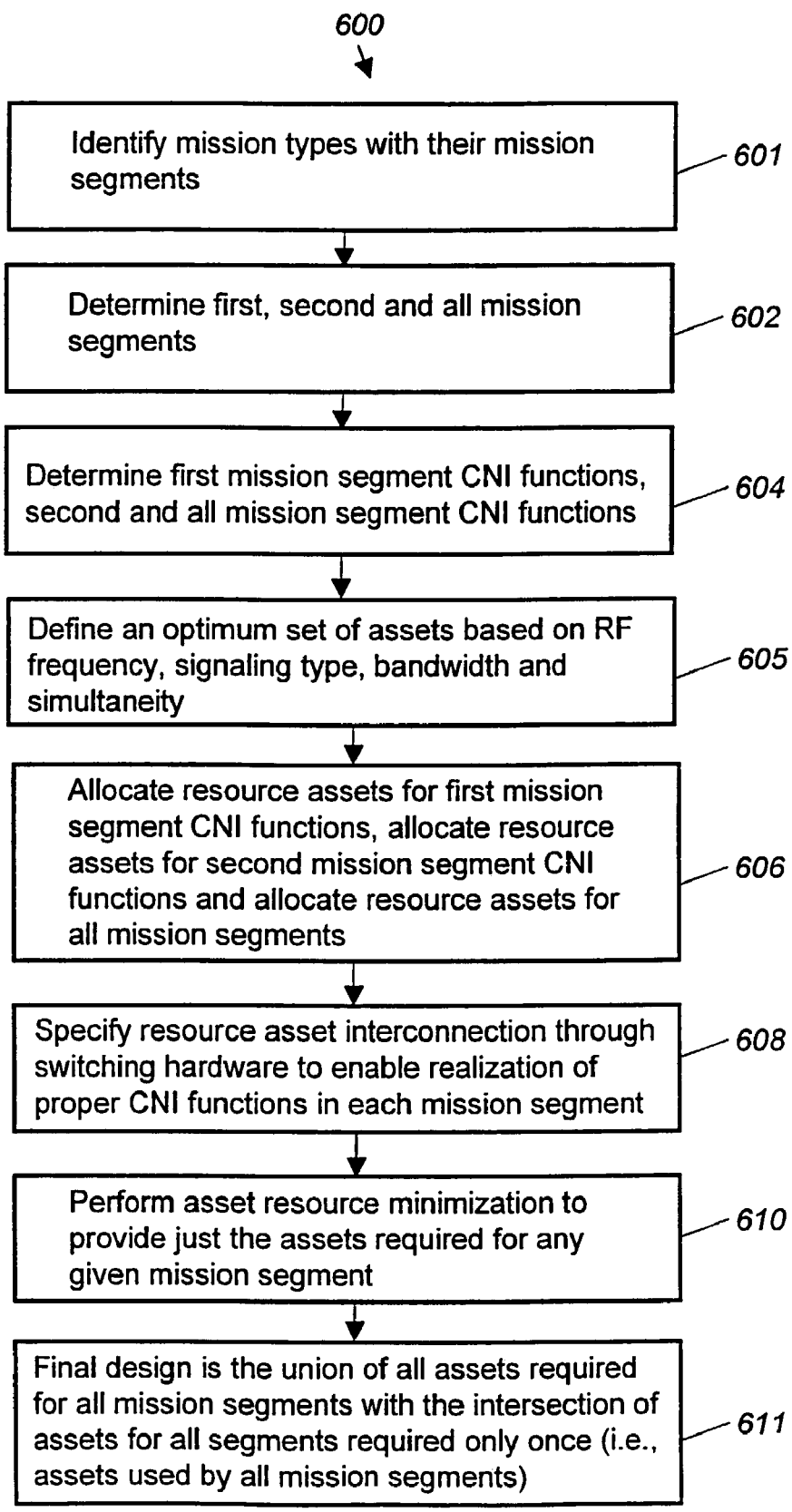
FIG. 6 shows a method for designing an electronic radio system.

With reference to FIG. 6, that figure shows a flowchart 600 of a method for designing an electronic radio system. At step 602, a first, second mission and all mission segments are defined (result of 501 and 601). Next, at step 604, the radio functions required in each of the mission steps are determined (result of 509). Next, define an optimum set of assets based on RF frequency, signaling type, bandwidths and simultaneity 605.

An asset resource allocation is performed to determine which asset resources are needed for the first mission segment radio functions and which asset resources are needed for the second and all mission segments radio functions (step 606). Next, the interconnection of resource assets through switching hardware is specified (step 608). The resource assets are connected such that all of the first mission segment radio functions are realizable during the first mission segment, all of the second, and all mission segments radio functions are realizable during the second mission segment and all mission segments.

At the resource asset minimization step 610, a minimal set of resource assets is determined (using, e.g., a minimization algorithm 611 which finds the less common assets quantity required that satisfy all mission segments for all missions), such that all of the radio functions associated with any one of the mission segments are simultaneously realizable using the minimal set of resource assets. Then, as additional mission segments occur, the processor 428 reprograms the radio function threads to implement the radio functions required in each additional mission segment. Because the number of resource assets has been minimized, the electronic radio system includes no unnecessary duplication of resource assets.

Figure 7:
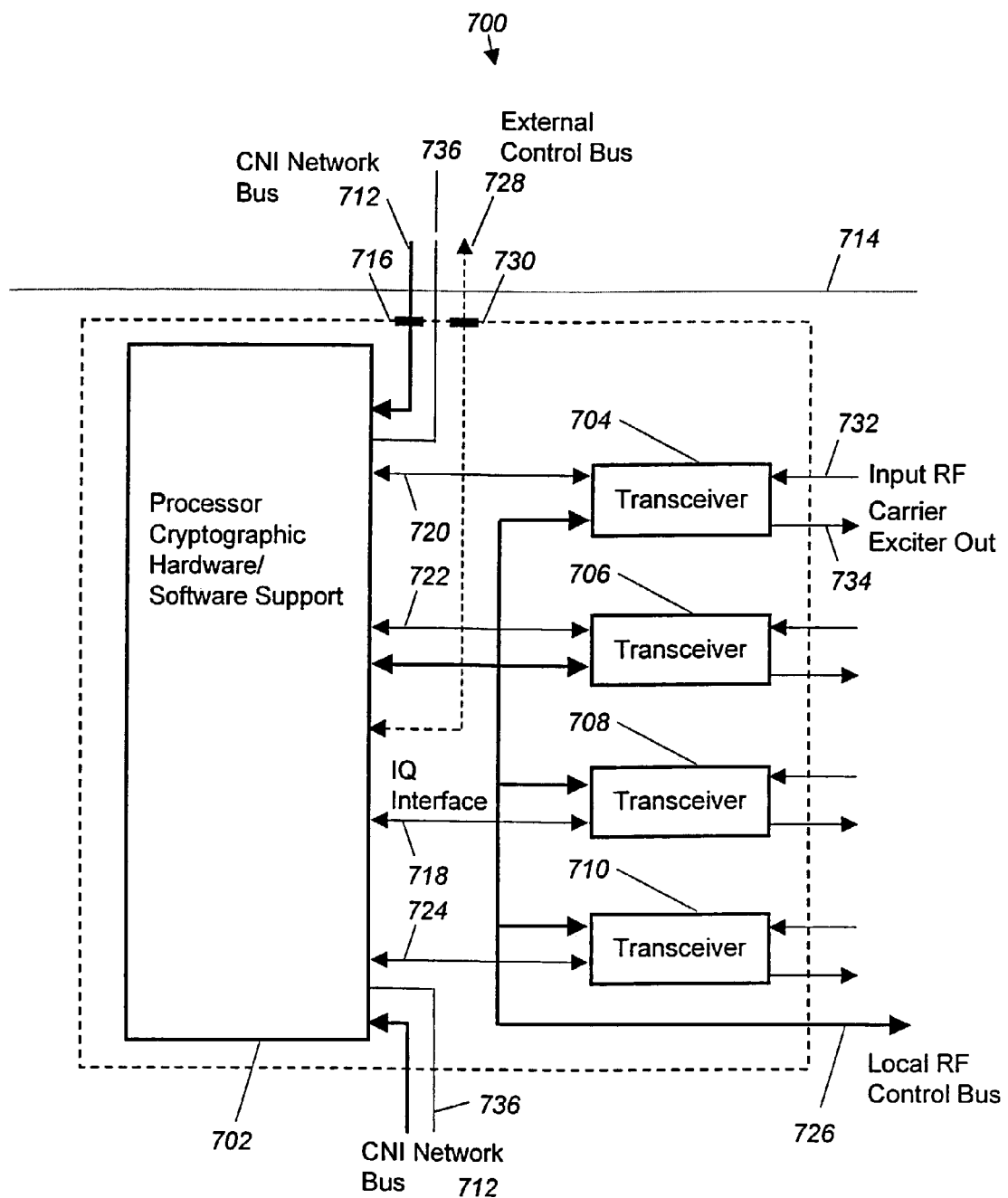
FIG. 7 illustrates a transceiver-processor building block for an electronic radio system.

Turning now to FIG. 7, that figure shows a transceiver-processor building block 700. The building block 700 includes a processor 702 coupled to multiple transceivers 704, 706, 708, 710. A CNI network bus 712 connects to the processor 702 from outside the multifunction slice boundary 714 through the CNI network bus connector 716. The building block 700 may be a physical hardware unit that may be inserted into a multifunction slice, for example. More generally, however, the building block 700 represents a design unit that an electronic radio system designer may, for example, retrieve from a CAD library when designing a new electronic radio system.

Inphase and Quadrature (IQ) interfaces 718, 720, 722, and 724 connect the processor 702 to the transceivers 704–710. The IQ interfaces 718–724, however, may be replaced with other data interfaces suitable for the particular modulation technique that the processor 702 employs. The building block 700 includes a local RF control bus 726 that also connects the processor 702 to the transceivers 704–710. Additionally, an external control bus 728 connects to the processor 702 and is accessible from outside the multifunction slice boundary 714 through the external control bus connector 730. Each transceiver 704–710 includes a RF input (e.g., the receive RF input 732) and a carrier generator transmit output (e.g., the carrier exciter output 734) that connect to, for example, an antenna interface/transmitter unit.

The processor 702 preferably includes cryptographic support for each transceiver 704–710 in the transmit and receive directions. In one embodiment, the processor 702 executes cryptographic support software from program memory to accomplish encryption and decryption as well as, ECCM (antijam) applications. In an alternate embodiment, dedicated cryptographic circuits are connected to the processor 702 using the CNI network bus 712, and the transceivers 704–710 to handle encryption, decryption and ECCM. The type of encryption applied is driven by the particular application in which the building block is used, and may include, for example, support for the following encryption and ECCM standards: KGV-8, KGV-10, KGV-11, KGV-23, KG-84A, KGR-96, KG-125, KY-58, and Havequick Applique.

The processor 702 performs high-rate control functions for the multifunction slice in which it resides. The high-rate control functions include preprocessing, signal processing, data/message processing, and cryptographic ECCM and message security processing for simultaneously implementing multiple radio functions. Thus, a single transceiver-processor building block 702 localizes the processing that, in the past, was distributed among numerous separate modules. Such localization may be implemented using high speed analog to digital converters, high clock speed processors, high density Field Programmable Gate Arrays, high density memories, integrated cryptoprocessors, and common off the shelf bus devices.

The processor 702 communicates outside of its multifunction slice over the CNI network bus 712. To this end, the CNI network bus 712 may be implemented as a common off the shelf bus, such as an IEEE-1394 bus. Because the CNI network bus 712 travels between multifunction slices, the CNI network bus is used for inter-slice communication, command, and coordination.

In particular, the CNI network bus 712 carries in most instances unencrypted (clear) information. The unencrypted information may include, as examples, voice data, transmission coordination data, and relay data. Voice data includes voice communications recovered from, or for transmission through, the transceivers 704–710. The transmission coordination data includes information concerning the ongoing operation of other multifunction slices so that the processor 702 is aware of the available or in-use communications frequencies and communication threads (co-site mitigation). Relay data includes information sent by another multifunction slice to the processor 702 for retransmission or reprocessing (for example, RF frequency band to another RF frequency band relay).

The CNI network bus 712 is preferably isolated from the local RF control bus 726, and the external control bus 728, using, for example, electromagnetic shielding 736. Isolating the CNI network bus 712 in this manner helps to prevent unencrypted or generally sensitive information from radiating through the transceivers 704–710 or antennas directly into space.

The transceivers 704–710 are preferably independently tunable over a wide range of frequencies and provide implementation of intermediate frequency, bandwidth, and gain characteristics, digitization of incoming RF signals, analog conversion of outgoing RF signals to transmitter PAs, and filtering of the incoming and outgoing RF signals before or after digitization. In order to control the transceivers, the local RF control bus 726 carries control information from the processor 702. To this end, the processor 702 may provide, for example, intermediate tuning frequency, intermediate frequency bandwidth and intermediate frequency gain characteristic configuration information for each transceiver 704–710 as determined by the predetermined need for communication threads.

The local RF control bus 726 is isolated inside the multifunction slice. In other words, the local RF control bus 726 is not directly accessible from outside the multifunction slice that incorporates the building block 714. Information on the RF control bus 726 may leave the building block 714 to control other assets within the host multifunction slice While information on the local RF control bus 726 may eventually work its way outside the multifunction slice through the processor 702 and the CNI network bus 712, it would be "sanitized" by the processor 702. No direct access to the local RF control bus 726 is provided.

With regard to the external control bus 728, however, the external control bus 728 may leave the multifunction slice and connect to other systems. As examples, the external control bus 728 may carry antenna switching and interferometer configuration information. Such information may be used to configure an antenna for identification or surveillance beam steering support, for example.

Figure 8:
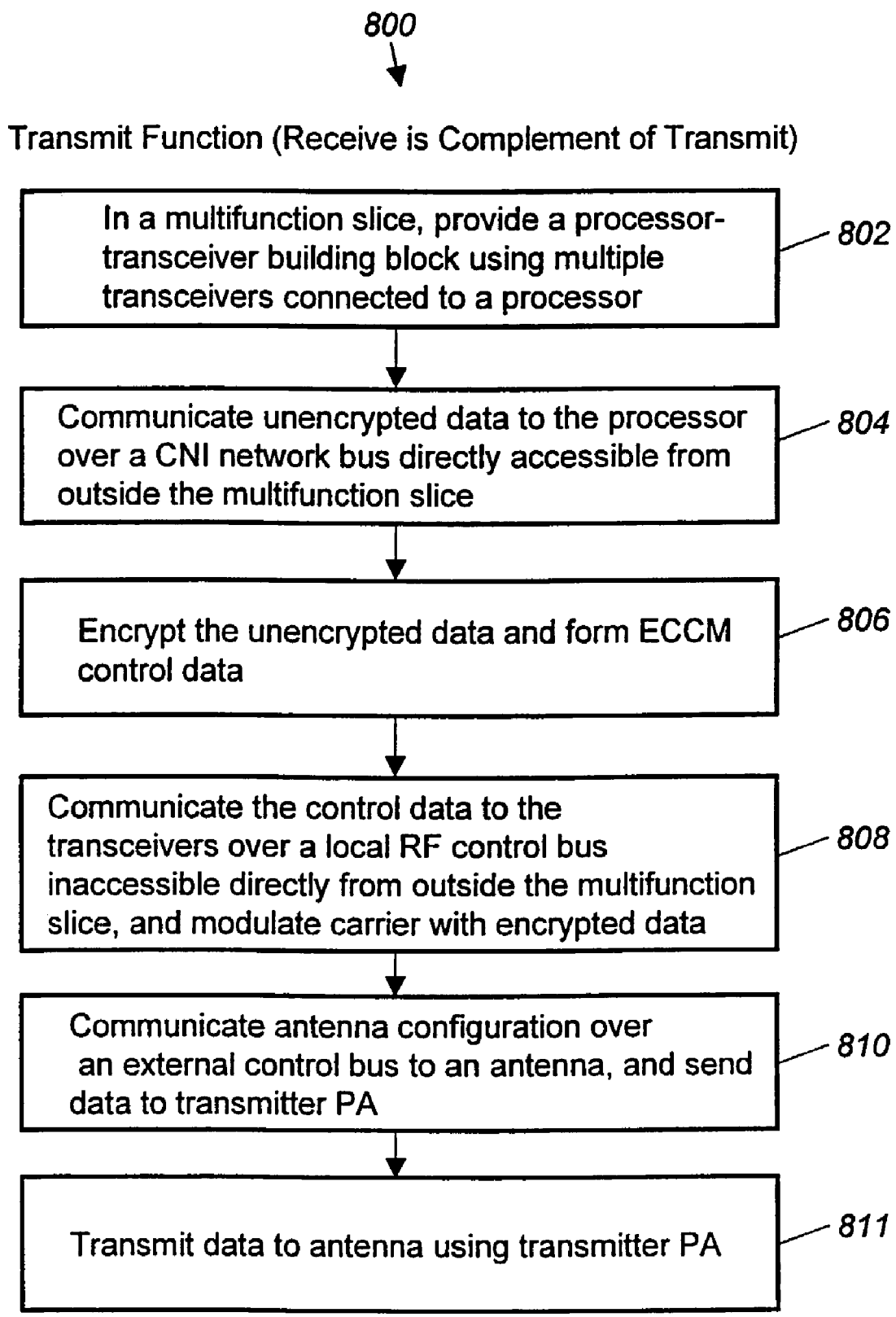
FIG. 8 shows a method for operating a transceiver-processor building block.

Turning next to FIG. 8, that figure shows a flow diagram 800 for operating a transceiver-processor building block for a transmit function. At step 802, a multifunction slice is provided that includes a transceiver-processor building block as described above (i.e., including several transceivers coupled to a processor). Next, the method communicates preferably unencrypted data over a CNI network bus to the processor (step 804). As noted above, the CNI network bus is accessible directly from outside the multifunction slice.

Continuing at step 806, the processor processes the data received over the network bus to form control data. The processor then communicates the control data to the transceivers over the local RF control bus (step 808). As noted above, the local RF control bus is inaccessible directly from outside the multifunction slice. Furthermore, as noted above, an external control bus may communicate antenna control data directly to an antenna outside the multifunction slice (steps 810 and 811).

Thus, the transceiver-processor building block 700 provides multiple channel radio capability that may be programmed using the CNI network bus 712 and local RF control bus 726 to perform transceiver, digital processing, and cryptographic functions for a wide range of electronic radio functions. Thus, the complex and costly federated (i.e., custom) design approach to prior radio systems is avoided. In other words, the transceiver-building block 700 provides a single design unit that eliminates the need for multiple uncommon receivers, transmitters, pre-processors, signal processors, data processors, and cryptographic processors used in the past. This provides significant savings to implement a new system, to test a new system and to logistically support a new system as a reduced set of common assets are required.

Note also that including cryptographic processing within the processor 702 allows the building block 700 to provide complete separation between the Red CNI network bus 712 and the Black local RF control bus 726. The system Red/Black boundary and Tempest boundary is established only in the processor and its backplane In other words data received over the CNI network bus 712 need not be propagated elsewhere before transmission, particularly not near areas of the electronic radio system that may cause the network bus data to be radiated into space. Furthermore, the independent IQ interfaces 718-724 and local RF control bus 726 greatly decreases interdependencies among radio functions, reduces the impact to the complete electronic radio system when a new radio function is added, limits radio system impacts that might otherwise be caused by an internal transceiver-processor building block failure propagating effects to other parts of the radio system, and simplifies integration and test during the development cycle.

While the invention has been described with reference to a preferred embodiment, it will be understood by those skilled in the art that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A reconfigurable electronic radio system comprising:
   a plurality of resource assets associated with an electronic radio system multifunction slice, the plurality of resource assets including an antenna interface, an avionics interface, a plurality of transceivers operable over a wide band of frequencies in transmit and receive modes, and a slice processor coupled to the transceivers to control their operation and to process data transmitted and data received through the transceivers; and
   a master processor coupled to said plurality of resource assets and operable to:
   generate, during a first mission segment, RF control signals to realize first mission segment radio functions by establishing first mission segment radio function threads through a first optimal set of preselected assets in said plurality of resource assets; and
   generate, during a second mission segment, RF control signals to realize second mission segment radio functions by establishing second mission segment radio function threads through a second optimal set of preselected assets in said plurality of resource assets.

2. The reconfigurable electronic radio system of claim 1, further comprising switching hardware coupled to the resource assets and to said master processor, and wherein said master processor is further operable to:
   generate first mission segment switching control signals to realize said first mission segment radio functions; and
   generate second mission segment switching control signals to realize said second mission segment radio functions.

3. The reconfigurable electronic radio system of claim 1, further comprising:
   a radio function set selection signal input coupled to said master processor;
   wherein a selection signal on said radio function set selection input determines which of said first set of control signals and said second set of control signals said master processor generates.

4. The reconfigurable electronic radio system of claim 3, wherein said selection signal is indicative of a current mission segment flown by an aircraft.

5. The reconfigurable electronic radio system of claim 3, wherein the selection signal is indicative of a pilot CNI function set selection.

6. The reconfigurable electronic radio system of claim 1, wherein the first mission segment is a departure and recovery mission segment and the first mission segment CNI functions include voice communications, glide-slope indication and radio beacon acquisition.

7. The reconfigurable electronic radio system of claim 6, wherein the second mission segment is a combat mission segment and the second mission segment CNI functions include encrypted voice secure data and ECCM communications.

8. The reconfigurable electronic radio system of claim 6, wherein the second mission segment is an enroute/refueling mission segment using navigation functions.

9. A method for controlling a set of resource assets in a reconfigurable electronic radio system, the method comprising:
   identifying first mission segment radio functions for a first mission segment;
   identifying second mission segment radio functions for a second mission segment;
   configuring a set of resource assets in at least one electronic radio system multifunction slice to realize the first mission segment radio functions during the first mission segment; and reconfiguring the set of resource assets to realize the second mission segment radio functions during the second mission segments;

wherein each electronic radio system multifunction slice comprises an antenna interface, an avionics interface, a plurality of transceivers operable over a wide band of frequencies in transmit and receive modes, and a slice processor coupled to the transceivers to control their operation and to process data transmitted and data received through the transceivers.

10. The method of claim 9, wherein the configuring step further comprises generating, at a processor, RF control signals for said resource assets.

11. The method of claim 9, wherein the reconfiguring step further comprises generating switching control signals for switching hardware coupled to said resource assets.

12. The method of claim 9, wherein the reconfiguring step further comprises generating RF control signals for said resource assets.

13. The method of claim 9, wherein the reconfiguring step further comprises generating switching control signals for switching hardware coupled to said resource assets.

14. The method of claim 9, wherein identifying first mission segment radio functions comprises identifying voice communications, glide-slope indication and radio beacon acquisition radio functions.

15. The method of claim 9, wherein identifying second mission segment radio functions comprises identifying encrypted voice secure data and ECCM communications radio functions.

16. A method for designing a electronic radio system, the method comprising:

defining a first mission segment and a second mission segment;

determining first mission segment radio functions for the first mission segment and second mission segment radio functions for the second mission segment;

defining an optimum set of resource assets based on RF frequencies, signaling type and RF bandwidths of all functions across all mission segments, wherein the resource assets are associated with an electronic radio system multifunction slice, the resource assets including an antenna interface, an avionics interface, a plurality of transceivers operable over a wide band of frequencies in transmit and receive modes, and a slice processor coupled to the transceivers to control their operation and to process data transmitted and data received through the transceivers;

determining minimum allocation of resource assets for the first mission segment to realize first mission segment CNI functions based on said optimum set of assets and determining a minimum allocation of resource assets for the second mission segment to realize the second mission segment CNI functions based on said optimum set of assets; and specifying resource asset interconnection through switching hardware that configures the resource assets to realize the first mission segment CNI functions during the first mission segment and that reconfigures the resource assets to realize the second mission segment CNI function during the second mission segments.

17. The method of claim 16, further comprising minimizing resource assets used to realize the radio functions for said first and second mission segments.

\* \* \* \* \*